United States Patent [19]

Steinle

[11] Patent Number: 5,040,872
[45] Date of Patent: Aug. 20, 1991

[54] BEAM SPLITTER/COMBINER WITH PATH LENGTH COMPENSATOR

[75] Inventor: Michael J. Steinle, Fort Collins, Colo.

[73] Assignee: Hewlett-Packard Company, Palo Alto, Calif.

[21] Appl. No.: 498,865

[22] Filed: Mar. 23, 1990

[51] Int. Cl.$^5$ .................. G02B 27/10; G01J 3/50
[52] U.S. Cl. ..................... 359/638; 359/629; 359/637
[58] Field of Search .............. 350/171, 173, 174, 166; 250/226

[56] References Cited

U.S. PATENT DOCUMENTS

| | | | |
|---|---|---|---|
| 1,319,292 | 10/1919 | Kunz | 350/173 |
| 1,371,970 | 3/1921 | Furman | 350/173 |
| 4,709,144 | 11/1987 | Vincent | 250/266 |
| 4,870,268 | 9/1989 | Vincent et al. | |

Primary Examiner—Jon W. Henry

[57] ABSTRACT

A color imaging assembly for forming spatially separated, color component images of an object on a unitary image plane, comprising an imaging lens adapted for receiving a polychromatic imaging light beam from the object for imaging the object on the unitary image plane; a unitary multilayered beam splitter disposed obliquely in the path of the polychromatic, imaging light beam for splitting the polychromatic light beam into a plurality of parallel, spatially separated, color component beams having optical axes positioned perpendicular to the unitary image plane; and a path length compensator device disposed between the beam splitter and the unitary image plane for refractively compensating for differences in optical path lengths of the plurality of color component beams whereby each of the color component beams provides a focused color component image of the object on the unitary image plane is disclosed. A beam combiner assembly having a component beam path length compensator device is also disclosed.

3 Claims, 5 Drawing Sheets

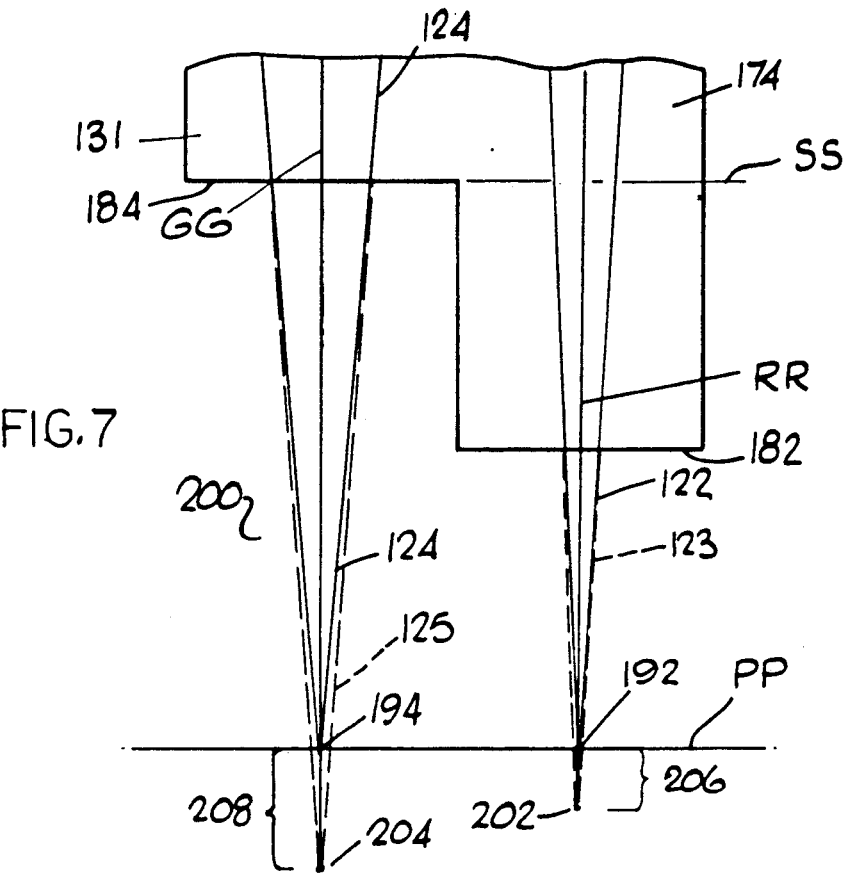
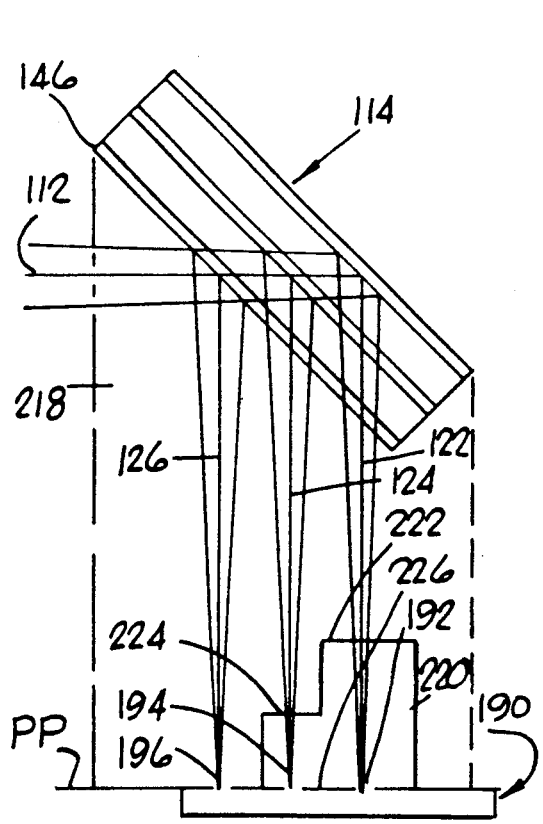
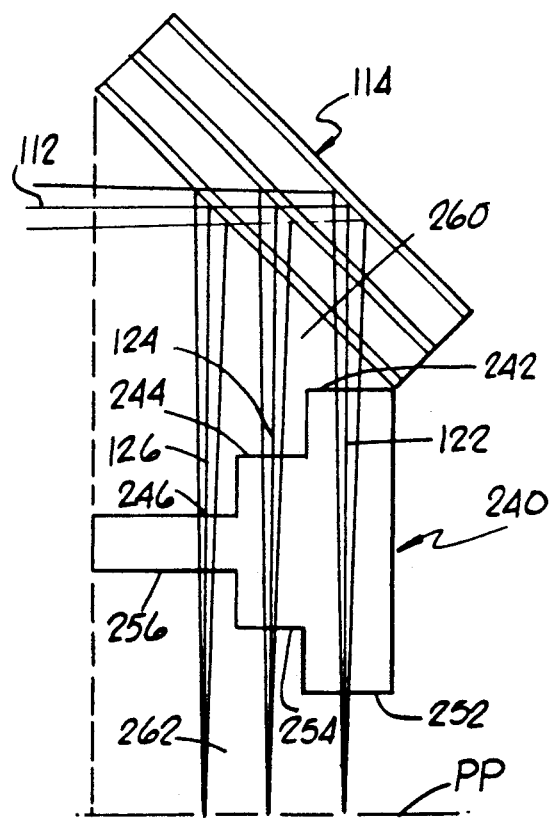

BEAM SPLITTER/COMBINER WITH PATH LENGTH COMPENSATOR

BACKGROUND OF THE INVENTION

The present invention relates generally to color imaging assemblies which employ multilayered dichroic composites for generating spatially separated, color component images of an object on an image plane and also to color combiners which employ multilayered dichroic composites for combining separate beams of light of different spectral ranges into a single combined beam. The invention relates particularly to path length compensators which are used in association with dichroic composites.

The phrase "beam of light" is sometimes narrowly defined to mean a bundle of parallel light rays such as those generated by a collimated light source. The phrase "beam of light" may also be more broadly defined to mean any narrow shaft of light having light rays traveling in the same general direction. Used in this broader sense, the light which emanates from an object and passes through the aperture of an imaging lens as well as the converging cone of light which emerges from the lens and which is focused on an image plane may be collectively referred to as a "beam of light". When the phrase "beam of light" is used herein, it is to be understood that this broader meaning is intended.

Vincent, U.S. Pat. No. 4,709,144 and Vincent et al., U.S. Pat. No. 4,870,268, which are hereby specifically incorporated by reference for all that is disclosed therein, describe a number of different dichroic composites which are used in beam splitter assemblies and beam combiner assemblies. An optical scanner which employs a beam splitter is described in U.S. patent application Ser. No. 383,463 filed July 20, 1989, for OPTICAL SCANNER of David Wayne Boyd, now U.S. Pat. No. 4,926,041 which is hereby specifically incorporated by reference for all that it discloses.

Problems associated with differences in optical path lengths in separated component beams arise when dichroic composites are used in beam splitters and/or beam combiners. Certain prior art beam splitter assemblies and associated techniques for resolving optical path length problems which are disclosed in U.S. Pat. Nos. 4,709,144 and 4,870,268 will now be briefly described.

FIG. 1 is a schematic side elevation view of a line-focus-type color imaging assembly comprising a line object 1 which originates a polychromatic light beam 4 which passes through an imaging lens 6 which is adapted to focus a line image of the line object on an image plane II located at a fixed optical path length distance from the imaging lens 6. The light beam 4 impinges upon a dichromatic beam splitter 56 which splits the polychromatic light beam 4 into spectrally and spatially separated color component beams 8, 9, 10 which provide focused color component images of the line object on a monolithic photosensor unit 11, FIGS. 1 and 2, positioned at the image plane II.

FIG. 1 illustrates the manner in which two optically flat transparent optical support media 60 and 62 can be attached to provide three substantially equally spaced dichroic coatings to produce three substantially parallel optical component beams 8, 9, 10 that are both spatially and spectrally separated. The optical separator 56 consists of precisely ground and polished glass plates 60 and 62 coated on one or both faces with dichroic coatings 50, 52 and 54. At each dichroic coating 50, 52 and 54, incident light is either reflected or transmitted according to wavelength with negligible absorption loss. The composition of the dichroic coatings 50, 52 and 54 can be designed for accurate bandpass filtration.

The plate 60, shown in FIG. 1, is designed such that incident light striking dichroic coating 50 at 45° reflects blue light (approximately 400-500 nm) while transmitting red light and green light.

Plate 62, shown in FIG. 1, is coated on both faces with dichroic coatings 52 and 54 such that an incident polychromatic light beam 4 striking a first dichroic coating 52 at nominally 45° reflects the red spectral band (e.g., 600-700 nm) while transmitting the green band. The green light striking a second dichroic coating 54 and having an optical axis oriented nominally 45° from the dichroic coating is reflected. The reflected green light is caused to pass back through the glass plate 62 and through the other dichroic coatings 52 and 50 at a 45° angle. As shown in FIG. 1, each of the color components 8, 9 and 10 of the incident light are reflected at 90 to incoming beam 4. The reflected red and green components 9 and 8 are parallel and separated from each other by a distance determined by the glass plate 62 and dichroic coating thickness 52, the index of refraction of plate 62, and the angle of incidence. Similarly, the blue and red components 10 and 9 are separated by a distance determined by the thickness of the glass plate 60, dichroic coating 50, the index of refraction of the plate 60 and the angle of incidence.

A mirror coating could be substituted for the third dichroic coating 54, since only the third remaining color component reaches that coating interface.

A suitable photosensor unit 11 for use with optical separator 56 is shown in FIG. 2. Photosensor 11 may be a single chip, single package solid state device having three linear photosensor arrays, 12, 13 and 14, precisely aligned and spaced to coincide with the focused line images formed by beams 8, 9 and 10, respectively, shown in FIG. 1.

As illustrated in FIG. 1, light in each of the color component beams 8, 9, 10 travels a different optical path length through the beam splitter 56. As a result in the differences in component beam light path length through beam splitter 56, photosensor unit 11 is skewed at an angle theta relative to a component beam normal plane such that the total optical path lengths of each of the different color components, as measured from lens 6 to the photosensor unit 11, are equal. Angle theta and the distance "D" between linear photosensor arrays 13, 14 are functions of glass plate and dichroic layer thickness X and index of refraction.

FIG. 3 shows a beam splitter/photosensor arrangement which enables photosensor 11 to be positioned perpendicular to the optical axes of the color-separated beams. In this arrangement, the path-lengths-through-glass of the color-separated beams are made equal by the reciprocal arrangement of trichromatic beam splitters 56 and 58.

As shown in FIG. 3, the incident light beam 4 is aligned to impinge the hypotenuse face 32 of right angle prism 51 at a normal angle and transmit therein to a first base side 30 of the prism 51 which the light beam impinges at 45°. The composite beam splitter 56 of FIG. 1 is attached thereto. A trichromatic separation of the red, green and blue spectral components of the incident light beam occurs as previously described. The three reflected component beams re-enter the prism 51 and are directed toward the second base side 34 of prism 51, each separated beam impinging the second base side 34 at 45° incidence. A second composite beam splitter 58 is attached to the second base side 34 of prism 51. The plates 60 and 62 and the dichroic coatings 50, 52 and 54 in beam splitters 56 and 58 are identical. However, the orientation of the composite beam splitters 56 and 58, and the multilayer dielectric coatings 50, 52 and 54 on each base side 30 and 34 of the prism 51 are reversed so that the path lengths of each component color beam entering and exiting the trichromatic prism beam splitter 59 are identical. That is, a component color beam, such as blue, reflects off the dichroic coating 50 on plate 60 located on base side 30. Next, the blue component reflects off the dichroic coating 50 on plate 60 located adjacent to base side 34. In a like manner, a red component color beam goes from middle filter 52 on base side 30 to middle filter 52 on base side 34, and the green component reflects off a backside filter 54 to a front side filter 54. Reflected beams from the trichromatic beam splitter 58 adjacent to base side 34 are directed out of prism 51. The beams are perpendicular to the hypotenuse side 32 and parallel to the incident light beam. The thickness of the beam splitter glass plates, 60 and 62, and the dichroic coatings, 50, 52 and 54, determine the separation of the reflected beams. Thus, the dual trichromatic beam splitter 59 provides an equal path length through the glass for all color components. Also, the light enters and leaves the prism at a normal angle of incidence.

Referring to FIG. 4, a fluorescent light source 22 illuminates the surface of an original document 21. A beam of imaging light from the original document is projected onto a beam splitter assembly, consisting of dichroic beam splitters 16 and 17, by lens 6. Beam splitters 16 and 17 are flat glass plates coated on one side with dichroic coatings 50 and 52, respectively. Beam splitter 16 is designed to reflect blue light while transmitting red and green spectral bands. The blue light is reflected to a first CCD linear-array photosensor 18, with beam splitter 16 tilted at 45° to the incident light beam 4. Beam splitter 17 reflects red light to a second CCD photodiode array sensor 20. The green line image passing through both beam splitter plates is captured by the third CCD photodiode array sensor 19. Beam splitter plate 17 is also aligned at 45°. to the incident light beam 4, as shown. In this arrangement in which each linear photosensor array 18, 19, 20 is provided on a separate photosensor unit differences in optical path lengths of the color component beams through beam splitters 16, 17 are compensated by individually adjusting the positions of the different photosensor units.

Thus, it is known in the prior art to adjust for component beam path length differences through a beam splitter by skewing a unitary plane, photosensor array relative a component beam normal plane. A problem with this solution is that skewing the photosensor array reduces the illumination of the photosensor array by an amount proportional to the cosine of the angle of skew. Such a skewed sensor configuration also produces astigmatism which reduces the modulated transfer function (MTF) of the image.

It is also known in the prior art to correct for component beam path length differences through a beam splitter by providing a second, complimentary beam splitter configuration. However, such a solution increases the total cost of optical system due to the additional cost of the second beam splitter. The second beam splitter may also compound optical degradation associated with the use of any dichroic beam splitter.

It is also known in the prior art to correct for path length differences through a beam splitter assembly by providing a different photosensor unit for each component beam. However, such an arrangement is not as compact as the other discussed arrangements and is subject to additive, tolerance-related problems of the type experienced in optical systems having multiple optical components which must be precisely positioned and aligned. A further problem is the additional expense associated with using multiple photosensor units.

SUMMARY OF THE INVENTION

The present invention is directed to color imaging assemblies and color combiners which employ multilayered, spectrally selective, reflective coatings such as multilayered dichroic composites for polychromatic light beam separation or for color component light beam combination. The invention employs a light path length compensator which compensates for differences in component beam light path length and which obviates the problems associated with prior art techniques for dealing with path length differences.

Thus, the invention may comprise a color imaging assembly for forming spatially separated, color component images of an object on a unitary image plane. The imaging assembly includes: an imaging lens assembly adapted for receiving a polychromatic imaging light beam from the object for imaging the object on the unitary image plane. A unitary multilayered beam splitter is disposed obliquely in the path of the polychromatic, imaging light beam for splitting the polychromatic light beam into a plurality of parallel, spatially separated, color component beams having optical axes positioned perpendicular to the unitary image plane. A path length compensator is disposed between the beam splitter and the unitary image plane for refractively compensating for differences in optical path lengths of the plurality of color component beams whereby each of the color component beams provides a focused color component image of the object on the unitary image plane.

The invention may also comprise a beam splitter assembly for separating an incident beam of imaging light into at least first and second parallel component light beams which produce first and second focused component images on first and second coplanar photosensor arrays which are separated by a distance "d". The beam splitter assembly includes a transparent plate having an index of refraction "n" and having first and second, opposite, parallel surfaces oriented at an angle of 45° relative to said incident light beam. A first dichroic layer is provided next adjacent to the first surface of the plate and is adapted to reflect light in a first spectral range for separating the first component beam from the incident beam of imaging light. A second dichroic layer is provided next adjacent to the second surface of the plate and is adapted to reflect light in a second spectral range for separating the second component beam from the incident beam of imaging light. A prism is provided which has an index of refraction equal to the index of refraction "n" of the plate. The prism has a first planar surface portion positioned in perpendicular, intersecting relationship with the first component beam has and a second surface portion positioned in perpendicular intersecting relationship with the second component beam. The prism first and second surface portions are parallel and are separated by a distance of approximately d/(n−1).

The invention may also comprise an optical device for spatially and spectrally combining a plurality of component optical beams into a combined optical beam having a unitary optical axis and a unitary field of focus. The optical device includes component light sources for generating a plurality of component optical beams having different spectral ranges and spatially separated optical axes. A unitary multilayered beam combiner is disposed in the paths of the component optical beams for combining the component optical beams into a combined optical beam having a unitary optical axis. A lens assembly receives the combined optical beam for focusing the combined optical beam on a unitary plane positioned normal to the combined optical beam. A path length compensator disposed between the beam combiner and the lens assembly refractively compensates for differences in optical path lengths of the plurality of component optical beams produced by interaction of the component beams with the beam combiner such that each spectral component of the combined optical beam is focused on the unitary normal plane.

The invention may also comprise a beam combiner assembly for combining first and second parallel component light beams which are produced by first and second, coplanar, component light sources separated by a distance "d" into a combined light beam. The combiner assembly includes a transparent plate having an index of refraction "n" and having first and second, opposite, parallel surfaces oriented at an angle of 45° relative to said combined light beam. A first dichroic layer is provided next adjacent to the first surface of the plate and is adapted to reflect light in a first spectral range for merging the first component beam into the combined beam. A second dichroic layer is provided next adjacent to the second surface of the plate and is adapted to reflect light in a second spectral range for merging the second component beam into the combined beam. A prism is provided having an index of refraction equal to the index of refraction "n" of the plate. The prism has a first planar surface portion positioned in perpendicular intersecting relationship with the first component beam and a second surface portion positioned in perpendicular intersecting relationship with the second component beam. The prism first and second surface portions are parallel and interface with a medium of index of refraction "m". The prism first and second surface portions are separated by a distance of approximately d/([n/m]−1).

BRIEF DESCRIPTION OF THE DRAWINGS

An illustrative and presently preferred embodiment of the invention is shown in the accompanying drawings in which:

FIG. 7 is a detail side elevation view of a light path compensator portion of the color imaging assembly of FIGS. 5 and 6.

FIG. 8 is a side elevation view of a first alternative light path compensator arrangement for a color imaging assembly.

FIG. 9 is a side elevation view of a second alternative light path compensator arrangement for a color imaging assembly.

DETAILED DESCRIPTION OF THE INVENTION

Figure 5:
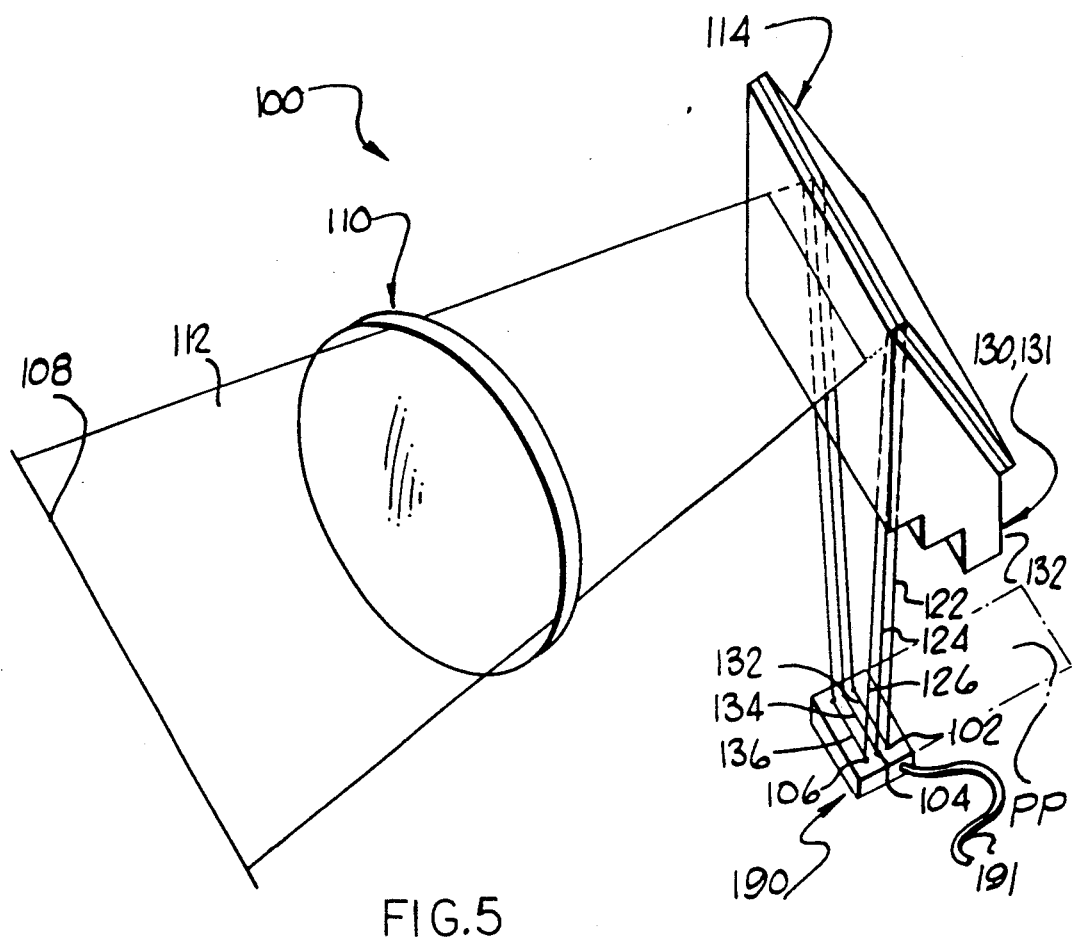
FIG. 5 is a perspective view of a color imaging assembly.
Figure 6:
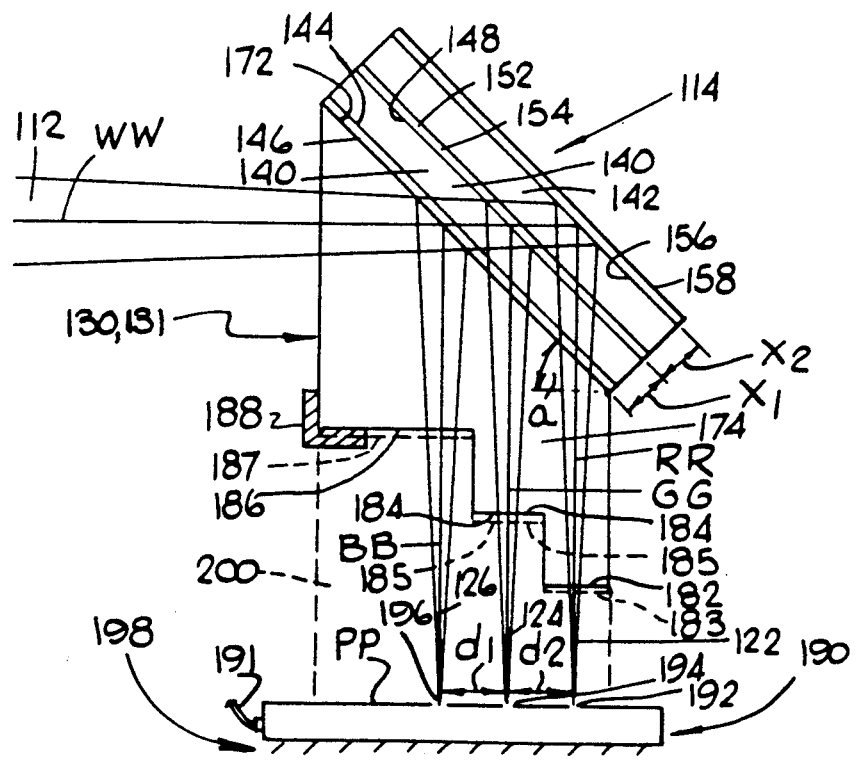
FIG. 6 is a side elevation view of a portion of the color imaging assembly of FIG. 5.

FIGS. 5 and 6 illustrate a color imaging assembly 100 for forming spatially separated color component images, e.g. red, green and blue images 102, 104, 106, of an object 108, such as the scan line of an optical scanner, on a unitary image plane PP. The color imaging assembly 100 includes an imaging lens assembly, shown schematically at 110, adapted for receiving a polychromatic imaging light beam 112, having a central beam axis WW, from the object 108 for imaging the object on the unitary image plane PP. A unitary dichroic beam splitter assembly 114 is disposed obliquely in the path of the polychromatic light beam 12 for splitting the polychromatic light beam into a plurality of parallel, spatially separated, color component beams 122, 124, 126 having parallel central optical axes RR, GG, BB positioned perpendicular to the unitary image plane PP. A path length compensator 130, which may comprise a prism 131, is disposed between the beam splitter assembly 114 and the unitary image plane PP for refractingly compensating for differences in optical path lengths of the plurality of color component beams 122, 124, 126 such that each of the color component beams provides a focused color component image 132, 134, 136 of the object 108 on the unitary image plane PP.

Having thus described the color imaging assembly 100 in general, various features thereof will now be described in further detail.

As shown in FIG. 5, the object 108 to be imaged may be a line object such as the scan line of an optical scanner such as that described in U.S. patent application Ser. No. 383,463 incorporated by reference above.

Lens assembly 110 may comprise a double Gauss lens assembly or other imaging lens assembly.

Unitary dichroic beam splitter 114 may be of the type described in U.S. Pat. Nos. 4,709,144 and 4,870,268 incorporated by reference above. The beam splitter comprises a first transparent plate 140 and a second transparent plate 142. The forward surface 144 of first plate 140 has a first dichroic coating 146 applied thereto which may be a blue light reflecting coating having a thickness of 0.002 mm. A rear surface 148 of the first glass plate may be coated with a second dichroic layer 152 which may be a green light reflecting layer having the same thickness as layer 146. A forward surface 154 of the second plate 152 may be adhered to the coated rear surface 148 of the first plate 140 by a thin layer, e.g. 0.005 mm thick, of transparent optical adhesive (not shown) such as Norland 61. A rear surface 156 of second plate 142 may be coated with a third dichroic layer 158 which may be a red light reflecting layer or which alternatively may be a mirror surface.

Path length compensator 130 may comprise a prism 31. Prism 131 comprises a forward, planar surface portion 170 which is positioned normal to the central longitudinal axis WW of incident light beam 112. Prism 131 comprises a planar, sloping, rear surface portion 172 which is positioned obliquely, at an angle "a", relative to incident light beam 112. In one preferred embodiment, surface 172 is inclined at an angle of 45° with respect to incident light beam central longitudinal axis WW. Prism 131 comprises a stairstep-shaped lower portion 174 having a first planar surface 182 positioned at a first predetermined distance from image plane PP; a second planar surface 184 positioned a second predetermined distance from image plane PP; and a third planar surface 186 positioned at a third predetermined distance from image plane PP. Surface 182 is positioned in alignment with component beam 122 and is oriented normal thereto. Similarly, second surface 184 and third surface 186 are aligned with and perpendicular to second and third component beams 124, 126, respectively.

In one embodiment of the invention, each of the surfaces 182, 184, 186 is provided with a thin filter coating 183, 185, 187 which is adapted to transmit light of the wavelength range of the associated component beam 122, 124, 126, respectively. Thus, filter layer 183 is adapted to transmit red light, filter layer 185 is adapted to transmit green light, and filter layer 187 is adapted to transmit blue light. Use of such filter layers may help to correct for inefficiencies in the light separating capabilities of associated dichroic layers 158, 152, 146, respectively, and thus may increase the spectral separation integrity of the beam splitter assembly. Prism 131 is fixedly located relative to lens assembly 110 as by a prism support member 188.

Figure 1:
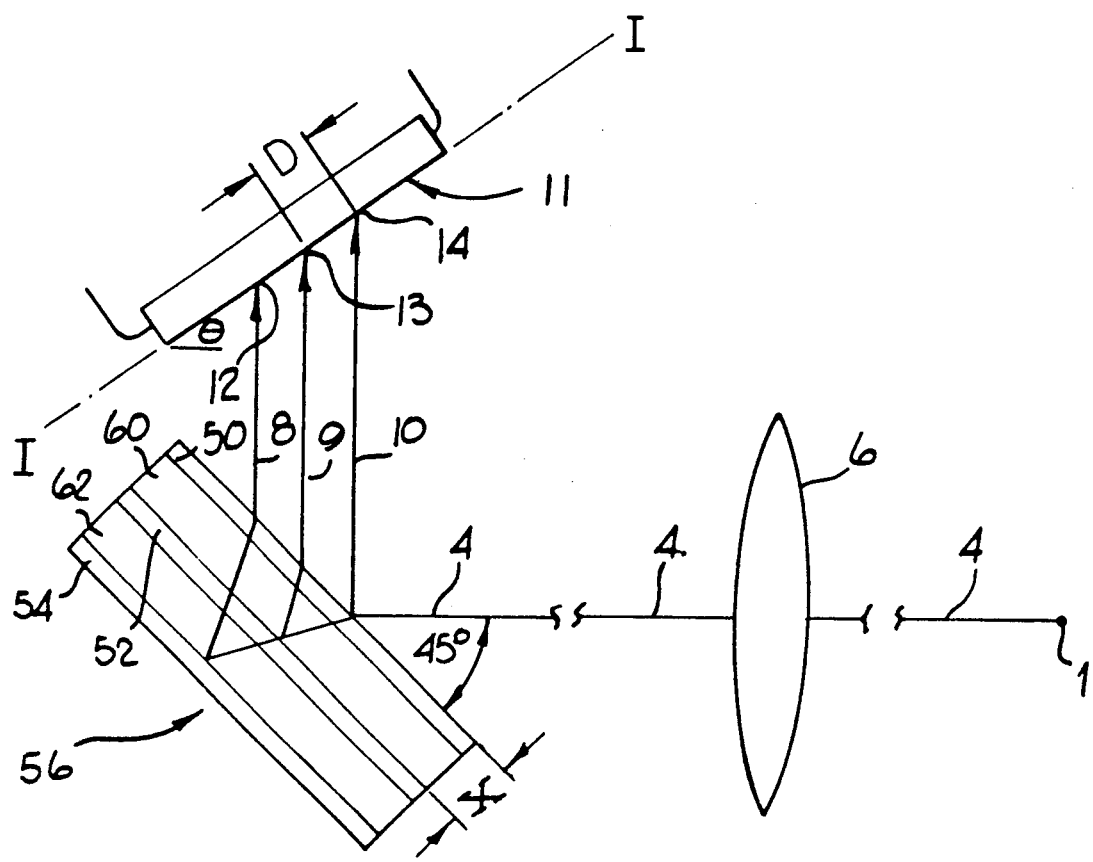
FIG. 1 is a side elevation view of a prior art color imaging assembly.
Figure 2:
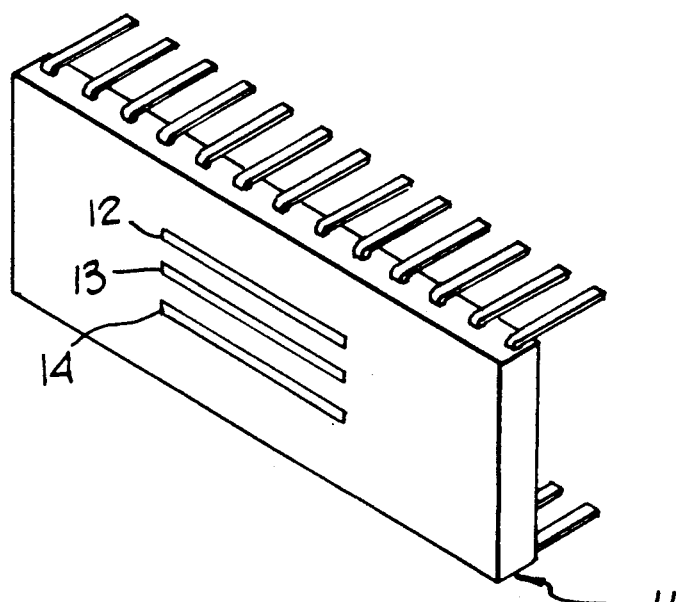
FIG. 2 is a perspective view of a prior art photosensor assembly.
Figure 3:
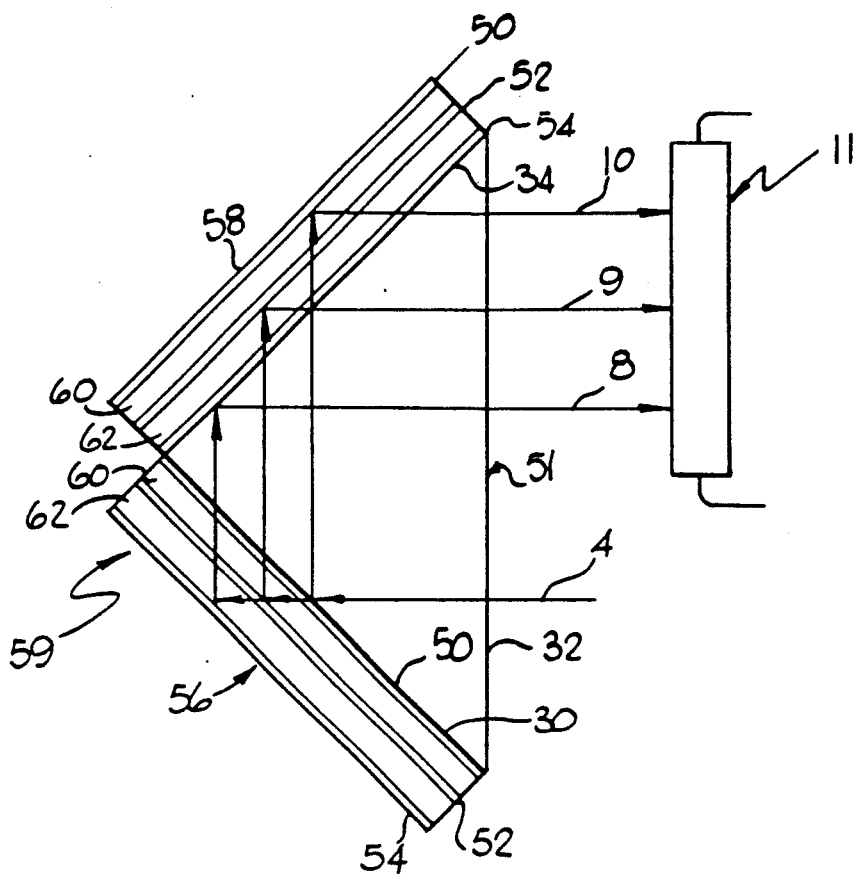
FIG. 3 is a side elevation view of a prior art dual trichromatic beam splitter assembly mounted on a prism.
Figure 4:
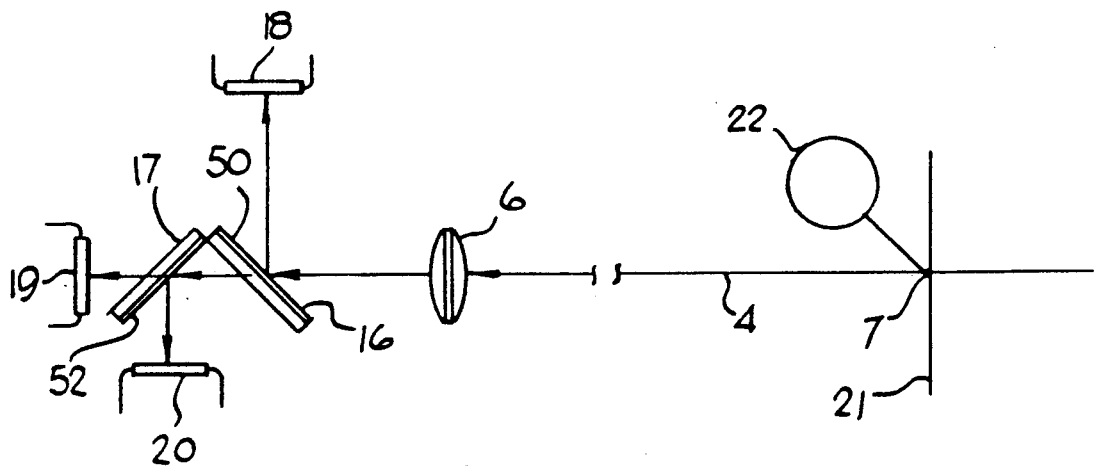
FIG. 4 is a side elevation view of a prior art color imaging assembly employing two beam splitter units and three separate photosensor units.

A monolithic photosensor assembly 190 having an electrical lead 191 adapted to transmit sensor signals to a suitable data processing and data storage unit (not shown) is provided directly below prism 131. The photosensor assembly 190 comprises a plurality of coplanar linear photosensor arrays 192, 194, 196 which are aligned with each of the plurality of component beams 122, 124, 126. Photosensor assembly 190 may correspond to the prior art photosensor assembly 11 shown in FIG. 1. The photosensor assembly 190 may be supported on a sensor support member 198 which is positioned in fixed relationship with prism support member 188. Each of the linear photosensor arrays 192, 194, 196 is adapted to transmit a signal representative of a color component image 132, 134, 136 which is focused thereon.

As indicated in phantom lines in FIG. 6, a medium, such as air, having an index of refraction less than the index of refraction of prism 131 interfaces with prism surfaces 182, 184, 186 either directly or at filter coatings 183, 185, 187. Although air is the presently preferred substance of medium 200, medium 200 might also comprise a second solid prism having an index of refraction less than the index of refraction of prism 131 or might comprise a transparent liquid such as certain oils used in optical systems and having an index of refraction less than the index of refraction of prism 131.

By locating surfaces 183, 185, 187 at different distances from image plane PP, the refraction of the associated component beams 122, 124, 126 occurs at correspondingly different axial positions along each of the component beams, thereby causing the focal point of each of the component beams to be shifted by a different amount. The amount of axial shifting of the focal point position of each of the component beams is selected to compensate for differences in the path lengths of each of the component beams through beam splitter 114. This shifting of the point of focus of each beam is illustrated in detail in FIG. 7. At a position designated by the plane SS which is coincident with surface 184, component beams 122 and 124 exhibit different degrees of convergence due to the fact that beam 122 has traveled a greater distance from focusing lens assembly 110 than has beam 124 due to the fact that beam 122 has traveled an additional distance through beam splitter 114. The light path and the point of focus which each of the beams 122, 124 would have if they were to pass through a single medium of continuous optical density is illustrated at 125 and 202, respectively, for beam 124 and at 123 and 202, respectively, for beam 122. However, due to the refraction which takes place at the interface between a medium of higher optical density and a medium of lower optical density, i.e. prism 131 and air 200, each of the component beams 122, 124 is caused to converge more rapidly after it passes through the medium interface provided at surfaces 182 and 184, respectively. The shift in focal point caused by the refraction of beam 122 at surface 182 is illustrated at 206. The shift in focal point which is caused by the refraction of beam 124 at surface 184 is illustrated at 208. The relatively greater focal point shift of beam 124 compensates for the greater distance through beam splitter 114 which has been traveled by beam 122, thus allowing both beams 122, 124 to be focused on an image plane PP positioned perpendicular to the axes RR, GG of each beam.

The specific manner of determining prism step distance in a beam splitter configuration such as shown in FIG. 6 in which the index of refraction of the prism 131 and the index of refraction of each of the plates 140, 142 are identical will now be described. Initially, it should be noted that the distances between the reflective surfaces of adjacent dichroic layers $x_1$, $x_2$ (which is nominally the thickness of each of the beam splitter plates 140, 142) is directly related to the spacing $d_1$, $d_2$ between photosensor arrays and to the angle of inclination "a" of the beam splitter to the incident light beam axis WW. When "a" is 45°, this relationship may be expressed as $x_1 = d_1 \cdot \sin(45°)$ and by the expression $x_2 = d_2 \cdot \sin(45°)$. For a prism configuration in which angle "a" is 45°, the step thickness $t_1$, $t_2$ between surfaces 186 and 184 and between surfaces 184 and 182, respectively, may be expressed as $t_1 = d_1/([n/m]-1)$ and $t_2 = d_2/([n/m]-1)$, where n is the index of refraction of the medium from which prism 131 and plates 140, 142 are constructed and where m is the index of refraction of medium 200. Typically, photosensor assemblies 190 are provided with evenly-spaced linear photosensor arrays 192, 194, 196 in which case $d_1 = d_2$, $x_1 = x_2$ and $t_1 = t_2$. In a preferred embodiment of the invention, medium 200 is air which has an index of refraction of 1.000. The glass plate thickness x and the step thickness t for such a configuration as shown in FIG. 6 having evenly spaced linear photosensor arrays and in which medium 200 is air is given in Table 1 below for and in which angle "a" is 45° a variety of different prism 131 matrix materials and different linear photosensor array spacings d. Sensor spacing d, plate thickness x, and step thickness t are each expressed in microns.

Use of a glass type such as LASFN18 having a relatively high index of refraction and use of a linear photosensor array spacing of 400 microns in a configuration of the type shown in FIG. 6 in which the second matrix material 200 is air, is presently the best mode contemplated for practicing the invention.

TABLE 1

| Glass Type | Index of Refraction | d (um) | x (um) | t (um) |
|---|---|---|---|---|
| BK7 | 1.519 | 200 | 141.4 | 385.3 |
| BK7 | 1.519 | 400 | 282.8 | 770.7 |
| BK7 | 1.519 | 600 | 424.3 | 1156.0 |
| SF2 | 1.653 | 200 | 141.4 | 306.3 |
| SF2 | 1.653 | 400 | 282.8 | 612.6 |
| SF2 | 1.653 | 600 | 424.3 | 918.9 |
| LASF08 | 1.791 | 200 | 141.4 | 252.9 |
| LASF08 | 1.791 | 400 | 282.8 | 505.8 |
| LASF08 | 1.791 | 600 | 424.3 | 758.7 |
| LASFN18 | 1.921 | 200 | 141.4 | 217.1 |
| LASFN18 | 1.921 | 400 | 282.8 | 434.2 |
| LASFN18 | 1.921 | 600 | 424.3 | 651.3 |

In an exemplary embodiment of the invention, the beam splitter 114, prism 131, and photosensor assembly 190 are used in association with a lens assembly 110 which comprises a double Gauss lens having an object distance of 357.1 mm, a focal length of 42.57 mm, an aperture f/number of 5.3, a transverse magnification of −0.126091, and an entrance pupil radius of 4.000. In such an arrangement used in association with a scan line 108 having a length of 216 mm and a line width of 0.0635 mm, prism forward surface 170 may have a height of 2.2 mm and a lateral dimension of 27 mm and may be located at a distance of 3.94 mm from line object 108 as measured along incident light path axis WW.

An alternative embodiment of the invention is illustrated in FIG. 8 in which the beam splitter assembly 114 forward dichroic layer 146 interfaces directly with a first, relatively low index of refraction medium 218 such as air. A second, relative higher index of refraction medium such as glass prism 220 has a lower surface portion 226 which interfaces with sensor assembly 190 at image plane PP. Prism 220 has a first planar surface portion 222 positioned in alignment with component beam 122 which is located at a first distance above image plane PP. Prism 220 has a second planar surface 224 which is positioned in alignment with component beam 124 and which is located below surface 222 at a second predetermined distance above image plane PP. In this configuration, since light in beams 122 and 124 passes from a relatively low index of refraction medium to a relatively higher index of refraction medium, the refraction occurring at surfaces 222 and 224 causes a decrease in the rate of convergence of the associated component beams 122, 124, causing a relative downward shift in the location of the focal point of each beam. Due to the difference in position of the surfaces which intersect each beam, the relative downward shift of the focus of beam 122 is greater than the downward shift in the focus of beam 124. Beam 126 which does not pass through prism 220 is, of course, not shifted at all. The relative height of surfaces 222 and 224 are selected such that the focal point of each beam is positioned at image plane PP. The same effect could, of course, be produced with a three-step prism which includes a step associated with component beam 126. Each of the different-height prism surfaces 222, 224 may be provided with a filter layer for increasing the spectral integrity of the associated component beam as described above with reference to filter layers 183, 185, 187 A prism configured such as prism 220 might also be positioned with surface 226 thereof in axially spaced relationship with image plane PP.

FIG. 9 illustrates an embodiment of the invention which employs a prism 240 of a first, relatively high index of refraction medium such as glass which as an upper, stairstep-shaped configuration comprising a first surface 242 aligned with component beam 122, a second surface 244 aligned with component beam 124, and a third surface 246 aligned with component beam 126. Prism 240 also comprises a lower, stairstep-shaped configuration comprising a fourth surface 252 aligned with component beam 122, a fifth surface 254 aligned with component beam 124, and a sixth surface 256 aligned with component beam 126. A second, relatively low index of refraction medium 260 such as air or a lower index of refraction glass interfaces with the upper stairstep-shaped configuration of prism 240 and also interfaces with beam splitter 114. A third, relatively low index of refraction medium 262 such as air or a lower index of refraction glass is positioned below prism 240 in interfacing relationship with the lower stairstep-shaped configuration thereof and in interfacing relationship with sensor assembly 190. In this embodiment, each component beam is refracted twice, once at an upper surface of prism 240 and once at a lower surface of prism 240 to produce a shift in the focal length thereof which compensates for light path length differences through beam splitter 114. This arrangement, in effect, combines the focus shifting capabilities of both a prism such as illustrated in FIG. 6 and a prism such as illustrated in FIG. 8. Each of the beam intersecting surfaces may be provided with a spectral filter coating.

Figure 10:
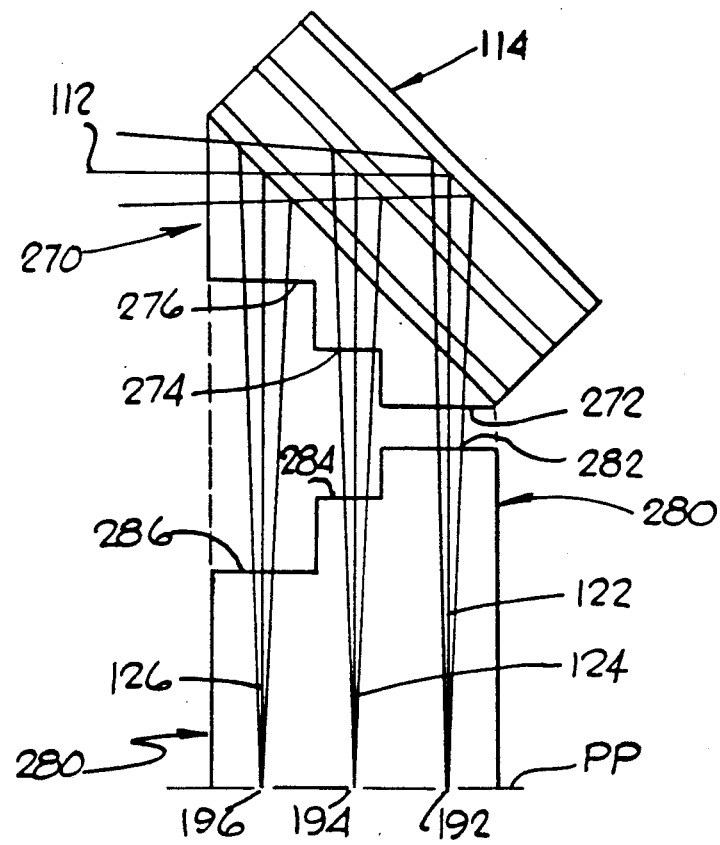
FIG. 10 is a side elevation view of a third alternative light path compensator arrangement for a color imaging assembly.

FIG. 10 illustrates a method for compensating for light path length differences through a beam splitter 114 which is, in effect, the inverse of that shown in FIG. 9. In the embodiment of FIG. 10, a first prism 270 constructed from a first medium with a relatively high index of refraction interfaces directly with beam splitter 114 and is provided with a plurality of stepped surfaces 272, 274, 276 aligned with component beams 122, 124, 126, respectively. A second prism 280 which is also constructed from a relatively high index of refraction medium such as glass is provided with an upper, stair-step-shaped surface configuration comprising planar surfaces 282, 284, 286 which intersect component beams 122, 124 and 126. Surfaces 282, 284, 286 may have a mirror-image configuration with respect to surfaces 272, 274, 276 of prism 270. A third medium 290 of a relatively low index of refraction, such as air, is provided between prisms 270 and 280 in interfacing relationship therewith. It will be appreciated from the discussion above that such a configuration also produces a corresponding shift in the focus of each of the component beams which may be used to compensate for path length differences through beam splitter 114 so as to produce a focused component image of the object at each of the linear photosensor arrays 192, 194, 196 which are positioned at image plane PP.

Figure 11:
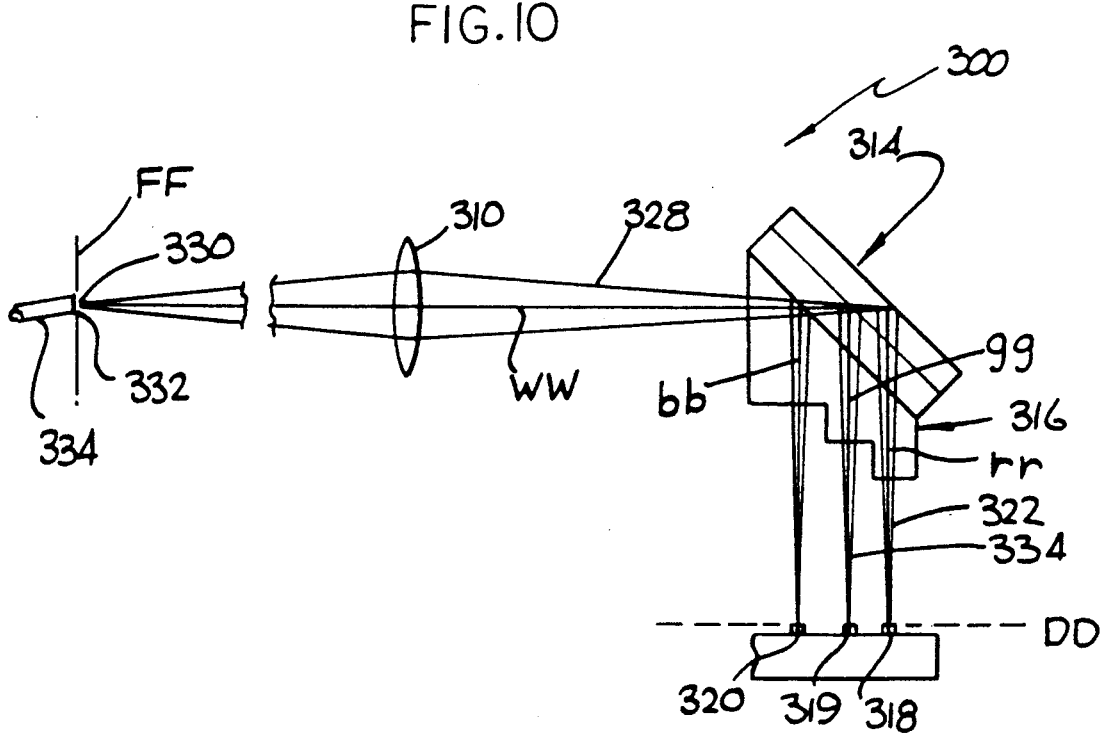
FIG. 11 is a side elevation view of a color beam combiner and focusing assembly.

Beam combiner assemblies are discussed in detail in U.S. Pat. No. 4,870,268 which is incorporated herein by reference. FIG. 11 illustrates the applicability of the present invention to beam combiners of the type disclosed in U.S. Pat. No. 4,870,268. The beam combiner and focusing assembly 300 of FIG. 11 comprises a lens assembly 310 for focusing a combined light beam, a unitary dichroic beam combiner assembly 314 which may be identical in construction to the beam splitter 114 described above with reference to FIG. 6. A path length compensator 316 is provided which may be identical in construction to that described above with reference to prism 131 in FIG. 6. Positioned below the path length compensator 316 are a plurality of color component light sources which may comprise a red light source 318, a green light source 319, and a blue light source 320 which may correspond in configuration and position to the linear photosensors 192, 194, 196 described in FIG. 6. Each of the component light sources produces a corresponding component beam 322, 324, 326 which is directed though a corresponding stepped portion of path length compensator 316 and which is reflected from an associated dichroic layer of beam combiner 314. The arrangement of the beam combiner assembly 314 is such that the component beams are combined into a single combined beam 328 having a unitary light path axis WW. The combined light beam 328 passes through a focusing lens assembly 310 which may be identical to lens assembly 110 described above with reference to FIG. 6. The lens assembly focuses the combined light beam at a common focal point 330 which may be positioned at the end face 332 of an optical fiber 334 which is used to transmit the combined light beam to a remote location. The combined light beam may be again separated into color component beams at the remote location by an assembly such as described in FIG. 6. It will be appreciated by those having skill in the art that, rather than providing a set of linear light sources and a line focus, a point light source and a point focus 330 might instead be provided. Path length compensator 316, for the same reasons discussed above with reference to FIG. 6, changes the convergence of each of the component beams 322,324, 326 to compensate for differences in path length thereof through beam combiner assembly 314 such that each of the component beams has the same point of focus 330 at image plane FF. It will be further appreciated from the above discussion that beam combiner assemblies having structure corresponding exactly to each of the beam splitter assemblies and path length compensators of FIGS. 8-10 could be provided by simply replacing each of the linear photosensor arrays 192, 194, 196 with linear light source arrays. It will also be obvious to those having skill in the art that the principles of path length compensation described herein may be used in each of the beam combiner applications described in U.S. Pat. No. 4,870,268.

Lens chromatic aberration is a problem common to many optical devices. Due to the fact that the index of refraction for any particular lens medium is slightly different for different spectral ranges of light, other lens parameter such as focal length, etc., also vary slightly for different spectral ranges of light. The above described path length compensators may be employed to correct for differences in focal lengths of component beams of different spectral ranges.

Another method for compensating for different focal lengths of different component beams in an imaging assembly or a combiner assembly of the type employing an imaging lens and multiple, parallel, spectrally selective, reflective layers such as dichroic layers is to arrange the dichroic layers, by selection of glass plate thickness or air gap distances such that the component beam having the longest focal length passes through the maximum number of layers and the component beam having the shortest focal length is reflected by the first surface layer, etc. and to arrange the spacing between reflective layers to correspond to component beam focal length differences. By making the distances between reflecting dichroic layers traveled by different component beams correspond exactly to the differences in focal lengths of the various component beams, the chromatic aberration of the lens is corrected.

As is known in prior art, the spacing between adjacent linear photosensor arrays in a beam splitter-type imaging assembly is a function of the distance between adjacent dichroic layers. Thus, this spacing between adjacent photosensor arrays must be tailored to the particular spacing between dichroic layers needed to correct for focal length differences of the color component beams for the particular lens assembly which is employed.

The same principles of component beam path length compensation for correcting lens chromatic aberration may, of course, also be applied to the dichroic composite of a beam combiner assembly.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A color imaging assembly for forming spatially separated, color component images of an object on a unitary image plane, comprising:
   (a) imaging means receiving a polychromatic imaging light beam from said object for imaging said object on said unitary image plane;
   (b) unitary beam splitter means having a plurality of parallel color component beam reflecting layers disposed obliquely in the path of said polychromatic, imaging light beam for splitting said polychromatic light beam into a plurality of parallel, spatially and spectrally separated, color component beams having optical axes positioned perpendicular to said unitary image plane; and
   (c) path length compensator means disposed between said beam splitter means and said unitary image plane for transmitting at least one of said spatially and spectrally separated color component beams therethrough for refractively compensating for differences in optical path lengths of said plurality of color component beams whereby each of said color component beams provides a focused color component image of said object on said unitary image plane, wherein said path length compensator means comprises:
   first transparent medium means having a first optical density and having a first end portion comprising a plurality of planar, parallel surface portions which each intersect a different color component beam at a different path length distance from said unitary imaging plane, wherein said first medium means comprises a first prism; and
   second transparent medium means having a second optical density different from said first optical density and having a first end portion comprising a plurality of planar parallel surface portions corresponding to said planar, parallel surface portions of said first transparent medium means and interfacing therewith, wherein said second medium means comprises a second prism.

2. A color imaging assembly for forming spatially separated, color component images of an object on a unitary image plane, comprising:
  (a) imaging means receiving a polychromatic imaging light beam from said object for imaging said object on said unitary image plane;
  (b) unitary beam splitter means having a plurality of parallel color component beam reflecting layers disposed obliquely in the path of said polychromatic, imaging light beam for splitting said polychromatic light beam into a plurality of parallel, spatially and spectrally separated, color component beams having optical axes positioned perpendicular to said unitary image plane; and
  (c) path length compensator means disposed between said beam splitter means and said unitary image plane for transmitting at least one of said spatially and spectrally separated color component beams therethrough for refractively compensating for differences in optical path lengths of said plurality of color component beams whereby each of said color component beams provides a focused color component image of said object on said unitary image plane, wherein said path length compensator means comprises:
    first transparent medium means having a first optical density and having a first end portion comprising a plurality of planar, parallel surface portions which each intersect a different color component beam at a different path length distance from said unitary imaging plane,
    wherein said first transparent medium means comprises a second end portion positioned opposite said first end portion, said second end portion comprising a plurality of planar parallel surface portions which each intersect a different color component beam at a different path length distance from said unitary imaging plane.

3. An optical device for spatially and spectrally combining a plurality of component optical beams into a combined optical beam having a unitary optical axis and a unitary field of focus comprising:
  (a) component light source means for generating a plurality of component optical beams having different spectral ranges and spatially separated optical axes;
  (b) unitary multilayered beam combiner means disposed in the paths of said component optical beams for combining said component optical beams into a combined optical beam having a unitary optical axis;
  (c) focusing means receiving said combined optical beam for focusing said combined optical beam on a unitary plane positioned normal to said combined optical beam; and
  (d) path length compensator means disposed between said beam combiner means and said lens means for refractingly compensating for differences in optical path lengths of said plurality of component optical beams produced by interaction of said component beams with said beam combiner means, whereby each spectral component of said combined optical beam is focused on said unitary normal plane, wherein said path length compensator means comprises:
    first transparent medium means having a first optical density and having a first end portion comprising a plurality of planar, parallel surface portions which each intersect a different component beam at a different axial position, wherein said first medium means comprises a first prism; and
    second transparent medium means having a second optical density different from said first optical density and having a first end portion comprising a plurality of planar parallel surface portions corresponding to said planar, parallel surface portions of said first transparent medium means and interfacing therewith, wherein said second medium means comprises a second prism.

* * * * *